March 21, 1961 C. A. McFADDEN ET AL 2,975,745
HEAT TREATING MACHINE
Filed Feb. 23, 1956 2 Sheets-Sheet 1

INVENTOR.
Charles A McFadden
BY Walter K. Mammel
Thomas Liddell
E. W. Mason
ATTORNEY.

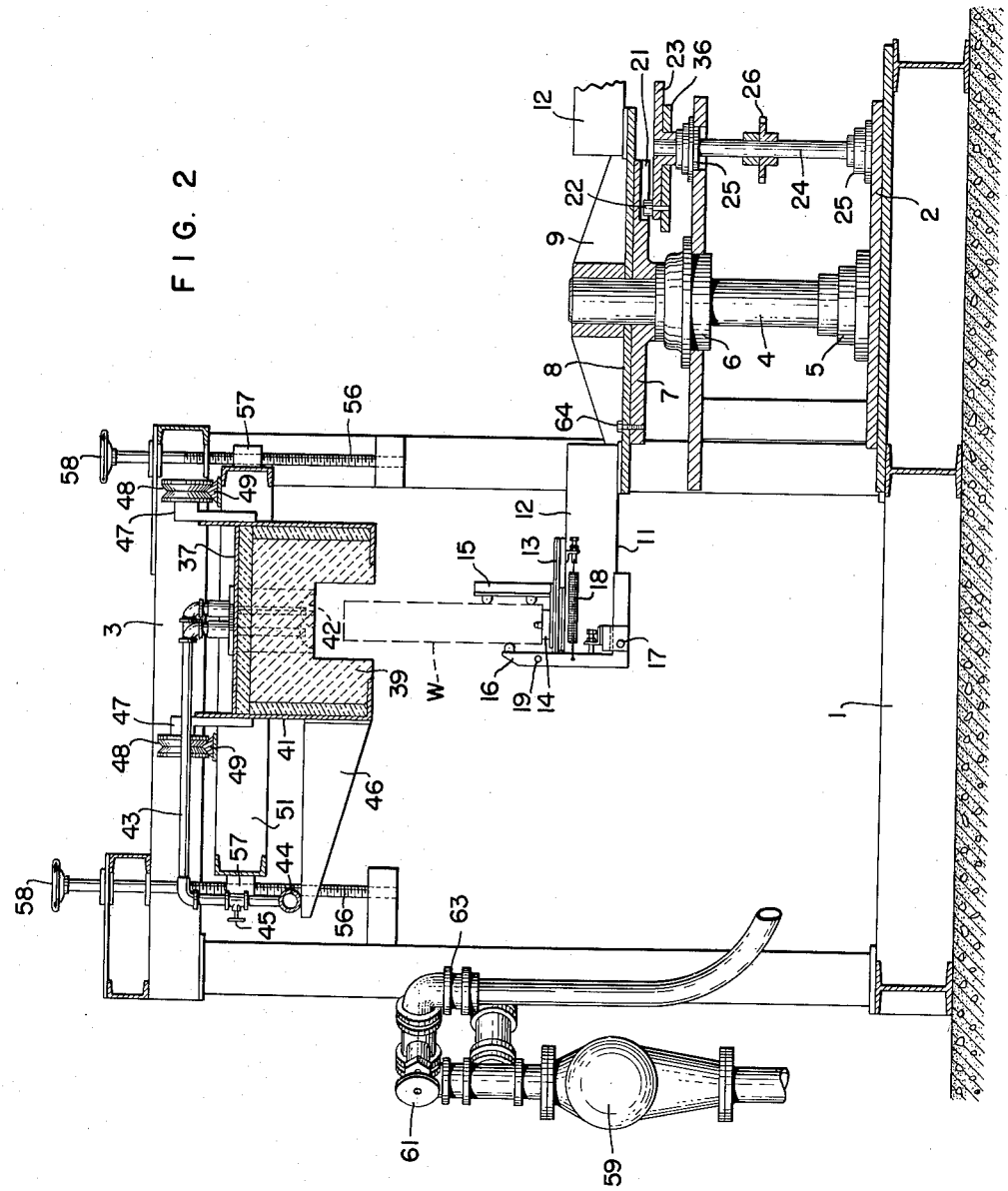

United States Patent Office 2,975,745
Patented Mar. 21, 1961

2,975,745

HEAT TREATING MACHINE

Charles A. McFadden, Wynnewood, Walter K. Mammel, Newtown, and Thomas Liddell, Wayne, Pa., assignors to Selas Corporation of America, Dresher, Pa., a corporation of Pennsylvania Filed Feb. 23, 1956, Ser. No. 567,287

11 Claims. (Cl. 113—128)

The present invention relates to automatic heat treating machines and more particularly to a machine for brazing an assembly of elements into a single unit.

In many instances it has been found desirable to braze a plurality of elements into an assembly. This operation requires a precise application of heat at the joint where the brazing is to occur, and heating the elements to a temperature sufficient to melt the brazing alloy without harming the metal of which the elements are made. Furthermore, the various elements must be heated evenly over the entire area of the joint. Frequently it is desirable to braze a plurality of joints in one operation.

Broadly it is an object of the invention to provide an automatic heat treating machine. More specifically, it is an object of the invention to produce a machine operative automatically to braze a plurality of elements into a single assembly. It is a further object of the invention to produce a machine that will move assemblies to be brazed successively into and out of a location where they are heated to brazing temperature.

A more specific object of the invention is to provide means to heat evenly and one after the other a plurality of work pieces to a predetermined temperature to perform an operation thereon.

The machine of the present invention is provided with a work supporting dial that is intermittently rotated to carry the work supported thereby through a plurality of stations. Associated with one or more of these stations is a heating device or devices that are used to heat the work and braze the joint. Ordinarily the work will be in the form of preassembled elements and brazing alloy, so that proper location of the assembly and heating thereof is the requirement. On assemblies in which a plurality of joints are brazed simultaneously, it is necessary that all of the joints be brought to brazing temperature at the same time. The heating device is therefore mounted so that it moves back and forth relative to the work during the time the work is in the heating station thereby to prevent any local hot spots.

In the following specification the machine is described as being designed to braze an assembly of elements forming a condenser or radiator. It will be apparent, however, that by merely changing the work holders other types of assemblies can be brazed. It will also be apparent that while the machine is capable of brazing simultaneously a plurality of joints, it can be used to braze a single joint at a time.

The various features of novelty which characterize our invention are pointed out with particularity in the claims annexed to and forming a part of this specification. For a better understanding of the invention, however, its advantages and specific objects attained with its use, reference should be had to the accompanying drawings and descriptive matter in which we have illustrated and described a preferred embodiment of the invention.

In the drawings:

Fig. 2 is a section taken on line 2—2 of Fig. 1.

Figure 1:
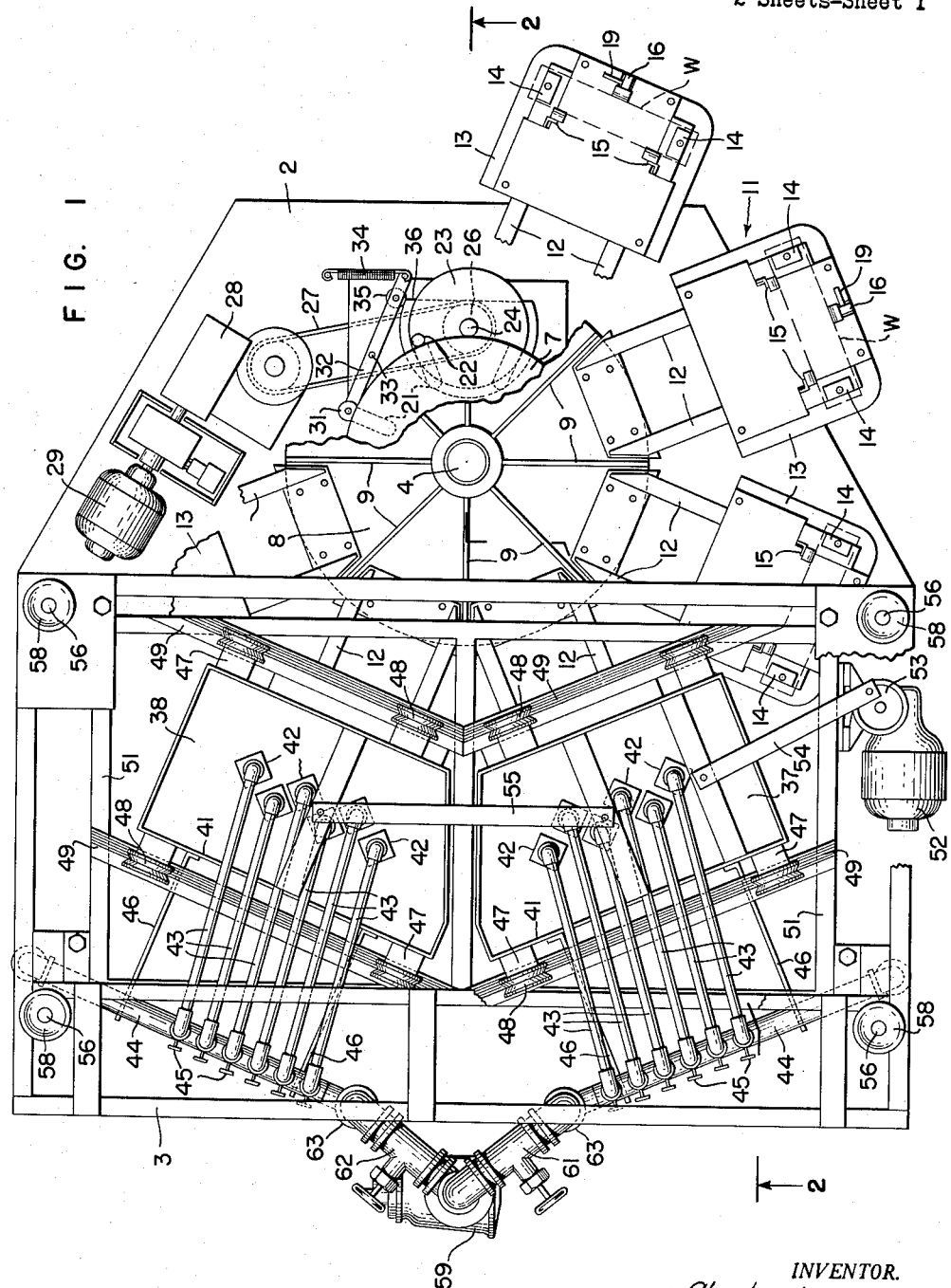
Fig. 1 is a plan view of the apparatus.

Referring to the drawings, there is shown a frame 1 including a base portion 2 upon which the work holding and moving elements are mounted, and an upper frame 3 from which the heating elements are suspended. The work holding and moving elements include a vertically extending shaft 4 that is suitably mounted for rotation in bearings 5 and 6. Keyed to the upper end of the shaft is a plate or dial 7 upon which a fixture table 8 is mounted. This table is in the form of a sheet metal disc that rests on dial 7, concentric with shaft 4, and which is provided with a plurality of radially extending reinforcing gussets 9. Work supporting fixtures 11, of which there are eight shown herein, extend radially from this plate between the gussets and include arms 12, fastened to the table 8, the outer ends of which are joined by a plate 13. Work locating elements are mounted on this plate and include a pair of bottom elements 14 and a pair of vertically extending elements 15 which are engaged by one side of the piece that is to be heated. The work is held against elements 15 by an element 16 that is pivoted at 17 on a cross-piece extending between the arms 12. Element 16 is normally held in engagement with the work by a spring 18 and can be moved away from the work by a handle 19. Referring to the drawing there is shown in dotted lines a piece of work W that is being heated. It will be seen that the lower portion of this piece of work rests on the locating elements 14 and that one side thereof is located by the elements 15. The piece is thus properly located and held in position by movable element 16. In placing a work piece in position on the holder the operator will move element 16 counterclockwise in Fig. 2 by handle 19, place the work against the locating portions of the elements 14 and 15 and release the handle. If desired some suitable means could be used automatically to engage the horizontally extending portion of element 16 to pivot this element to work releasing position automatically when the table has reached a predetermined rotary position.

The dial carrying table 8 is rotated or indexed by a Geneva gear mechanism which includes radially extending slots 21 that are formed in the lower surface of dial 7. These slots periodically receive a roller 22 projecting upwardly from a disc 23 that is fixed to a vertically extending shaft 24. The shaft is mounted in suitable bearings 25 and is rotated by a sprocket 26 that is in turn driven through a chain 27 from a gear reducing assembly 28. The assembly is driven by a motor 29. If it is desired, the motor 29 can drive assembly 28 through an intermittently operated clutch. This would give the advantage of a rapid indexing movement of table 7 with a dwell between indexing movements of any desired time.

In the operation of this portion of the apparatus the motor is rotating and through the assembly 28 and chain 29 rotates disc 23 intermittently or at a constant speed.

Periodically roller 22 will be moved, as best shown in Fig. 1, in a counterclockwise direction into one of the slots 21. The pin will therefore rotate dial 7 and the work holding fixtures carried thereby in a clockwise direction for a distance that is determined by the dimensions of the parts which, in this case, is one-eighth of a revolution. At the end of each rotative movement of the dial 7, this dial is locked in position by a roller 31 that is pressed into the end of one of the slots 21 as best shown in Fig. 1. Roller 31 is mounted on the end of a lever 32 that is pivoted at 33 and biased into engaging position by a spring 34. In order to prevent accidental movement of the dial between the times it is positively moved by roller 22, the right end of lever 32 has a roller 35 on it which bears against the surface of a cam 36, also mounted on shaft 24. It will be seen from an inspection of Fig. 1 that roller 22 is immediately adjacent to the entrance of one of the slots 21 and the roller 35 is immediately adjacent to the edge of the low portion of cam 36. As disc 23 continues to rotate in a counter-clockwise direction, the low portion of cam 36 will move under roller 35 at the same time roller 22 will enter one of the slots 21. Thereafter, continued movement of disc 23 will rotate the dial 7. As the dial rotates it will move roller 31 radially outwardly against the force of spring 34. As the roller 22 leaves slots 21, the high portion of cam 36 will again move under roller 35, positively to lock the dial in position until such time as another movement is to be imparted thereto.

The work pieces W carried by the supports 11 are heated by a pair of heating elements 37 and 38 that are located in a position to be above the work holders in two consecutive stations thereof as dial 7 is rotated around shaft 4. Each of these heating elements is shown herein as being inverted U shape so that it has an elongated channel through which the work moves. Each of the elements consists of refractory material 39 that is backed up by sheet steel 41 in the ordinary manner of constructing elements of this type. Each of the heating elements is provided with a row of burners 42 that extend through the top into the channel formed by the U. It will be seen from the drawings that the burners are staggered so that the upper surface of the heating element will be evenly heated. The burners are disclosed herein as being, and are preferably, of the type shown in Hess Patent 2,215,079. These burners have the characteristic of heating the burner cup to incandescence so that radiant heat of high intensity is directed against the work. There is also heating provided by the hot products of combustion which blanket the work and protect it somewhat from oxidation. These burners are supplied individually through pipes 43 that are connected to a manifold 44. Each of the pipes 43 has a valve 45 in it so that the burners can be individually adjusted. Brackets 46 project from the side of each heating element to support the pipes 43 and manifold for that element.

The heating elements are mounted for limited horizontal movement above the work pieces. As shown herein, they are so mounted that each one moves back and forth in a direction that is substantially tangential to the path of movement of a work piece as it moves into and out of the respective heating stations. To this end, each corner of each heating element is provided with a bracket 47 upon which is journaled a wheel 48. These wheels ride upon tracks 49 that are fastened to a frame 51. Movement is imparted to the heating elements to move them a short distance back and forth along the tracks by a motor 52 mounted on a frame 51. This motor drives a disc 53 that has one end of a link 54 attached eccentrically thereto, with the other end of the link pivoted to the top of heating element 37. A second link 55 connects heating element 37 with the element 38. Therefore as disc 53 is rotated, the two heating elements will be moved back and forth a distance dependent upon the radial distance of the pin connecting link 54 with disc 53 from the center of the disc.

Frame 51 supporting the heating elements and their moving mechanism can be moved vertically in order to vary the height of these elements relative to table 8 as work pieces of different heights are to be heated. To this end there are provided screws 56 that are suitably journaled for rotation without axial movement in the corners of frame 3. These screws receive threaded members 57 which are attached to the corners of frame 51. Therefore, when handles 58 on the upper ends of the screws are rotated, the frame 51 and the heating elements carried thereby will be adjusted vertically with respect to the work supports. If desired, some conventional means can be provided to rotate the handles 58 simultaneously.

Fuel is supplied to the manifolds 44 in the form of a combustible mixture of gas and air from some suitable mixing machine that is located adjacent to the apparatus of the invention. Normally the fuel will pass through suitable pipes to a firecheck 59 and piping including valves 61 and 62 that are fastened rigidly to frame 1. The outlets of the valves go to the pipes 63. A suitable, flexible hose, not shown herein, will extend from the pipes 63 to the outer ends of the manifolds 44, thereby permitting movement of these manifolds without interrupting the supply of gas to the burners as the heating elements move back and forth.

The work holders shown herein are designed to support the elements of a radiator assembly so that the various parts of one end can be brazed. Ordinarily the top of this assembly will be rectangular as shown in outline in Fig. 1 and will require a number of joints to be brazed at the same time. An operator will place the assembled elements of the radiator with the end to be brazed uppermost on one of the platforms 11 in a manner previously described. Thereafter, at intervals depending upon the speed of rotation of shaft 24, the work supports will be indexed to move the radiator assemblies one after the other between the side walls of the heating elements and under burners 42 as shown in Fig. 2. During the time that the assemblies are stationary in these positions, the heating elements are moved back and forth continually by motor 52. This insures that the entire top surface of the assembly will be heated evenly. No one position can be heated even slightly more than another because of the placement of the burners. The even heating of the entire upper surface of the work piece assembly without localized hot spots is assured, thus producing simultaneous brazing of all the joints thereon.

The rotating table shown herein has eight work supports. One of the locations, preferably the lower one in Fig. 1, would be designated as the loading and unloading station. The next station in a clockwise direction holds a workpiece ready to move under a heating element. The work is heated in the next two stations as it is resting first under heating element 37 and then under heating element 38. The other four stations around table 8 give the work time to cool and the brazed joints a chance to freeze solidly, prior to the time the now brazed assembly is removed from a work holder at the loading and unloading station and replaced by one that is to be brazed. Heating for brazing requires a nice balance of time required to bring the parts up to temperature and time at temperature in order to melt the brazing alloy without harming the metal of the assembled parts. This can be achieved by using one or more of the heating stations and varying the temperature of the heating elements as well as the interval of time between which the table 8 is indexed. These various factors may be adjusted easily with the apparatus of this invention. The temperature of the heating elements can be regulated by adjusting valves 61 and 62 or various burners can be regulated individually by adjusting the valves 45. The frequency and speed of the indexing movements of the table 8, and the dwell between each indexing movement thereof, can be determined by an adjustment of the gear reducing assembly 28 and the intervals of time during which it is operated. Thus a temperature to which the assemblies are to be heated can accurately be predetermined and adjusted, thereby assuring proper brazing and reproducibility of results.

While the shape of the heating element shown herein and the construction of the work supporting fixtures is designed specifically for brazing radiator assemblies, it will be obvious that other types of assemblies can be brazed on the present apparatus. This can easily be accomplished by removing table 8 and the work holders attached thereto from dial 7, and replacing it with another. When in working position table 8 is bolted to dial 7, as shown at 64. The heating elements can be raised and lowered to accommodate work pieces of various heights, and they are moved back and forth to insure even heating of any type of assembly that is to be brazed.

From the above description it will be seen that we have provided a machine for automatically brazing assemblies or for heating parts for other purposes, which is so designed that the parts are moved into and out of heating positions automatically after they have been placed upon a suitable supporting fixture.

While in accordance with the provisions of the statutes, we have illustrated and described the best form of embodiment of our invention now known to us, it will be apparent to those skilled in the art that changes may be made in the form of the apparatus disclosed without departing from the spirit and scope of the invention as set forth in the appended claims, and that in some cases certain features of our invention may be used to advantage without a corresponding use of other features.

What is claimed is:

1. In a device for applying heat to a plurality of work pieces, the combination of a frame, an elongated heating element, fixed supporting means on said frame having thereon means to mount said element for limited rectilinear movement in the direction of its length and in a given plane, a work carrying table having a plurality of work holders thereon, means to mount said table on said frame for rotary movement in a plane parallel to the plane of movement of and in front of said element whereby work pieces carried by said holders will be moved into a position in front of said element to be heated thereby, means to move said table intermittently to bring said holders successively into said position, said mounting means being so positioned relative to said table that the path of movement of said element is substantially parallel to the movement of a work piece into and out of said position and means on said supporting means to move said element continuously back and forth through its path of limited movement.

2. The combination of claim 1 in which said heating element is U-shaped, burners in one of the walls of said U firing inwardly, said element mounting means and said table mounting means being so located relative to each other that when a work piece on a holder is in said position it is between the legs of the U, and said means to move said table operating to move said holders substantially lengthwise of said element to bring work pieces into and out of said position.

3. The combination of claim 2 including means to move said element perpendicularly toward and from work pieces in said position.

4. In a brazing machine, the combination of a horizontally extending table having a plurality of work holders located at spaced points thereon, means to rotate intermittently said table to carry said work holders through a path including a heating station, a heating device including a plurality of aligned burners, stationary means to mount said device above said heating station with said aligned burners extending in a direction substantially tangent to the movement of said work holders into and out of said station and with said burners directed toward a work piece located at said station, and means to reciprocate continuously said device on said mounting means above said station in the direction of alignment of said burners thereby to heat evenly work carried by a work holder at said station.

5. In a brazing machine, a heating device including a plurality of burners in a row, a stationary track, means to mount said device for limited movement on said track in the direction of said row, means continuously to reciprocate said device on said track, a table, means to mount said table for rotation in a plane parallel to the plane in which said device moves, said table extending under said track, a plurality of work holders on said table in positions to be aligned with said device as said table rotates, means to rotate said table in a plurality of steps with each step terminating with a work holder aligned with said device as the latter is reciprocated, and means to adjust the distance between said device and said table so that work of different size carried by said work holders is heated by the burners of said device.

6. In a brazing machine, a table, a plurality of work holders located at spaced positions on said table, means to rotate said table intermittently to bring each of said work holders successively to a given position, a support having a portion extending parallel to said table at said position, tracks on said support parallel to the plane of movement of said table, said tracks being located adjacent to and extending substantially tangent to the path of movement of a work holder into and out of said position, a carriage having heating means, means to mount said carriage for movement on said track with the heating means facing said work holders, and means to move said carriage back and forth continuously on said tracks.

7. The combination of claim 6 in which said carriage has a U-shaped portion with the legs of the U extending on opposite sides of work to be heated on said work holders when they are in said position, and in which said heating means is located in the cross piece between the legs of said U.

8. The combination of claim 7 in which said heating means comprises a plurality of burners aligned in the direction of movement of said carriage.

9. In a brazing machine, a table having a plurality of work holders thereon, means to rotate said table intermittently to carry said work holders to a plurality of stations including a pair of adjacent heating stations, a stationary support having a portion thereof extending parallel to the plane of movement of said table and overlying said heating stations, a pair of track means on said support, each of said track means being parallel to the plane of movement of said table and extending in a direction substantially tangent to the movement of a work holder into and out of position in one of said heating stations, a heating device mounted for movement on each track means with each heating device forcing one heating station, and means to move said heating devices continuously back and forth on said track means thereby to heat evenly work carried by said work holders.

10. In a brazing machine, a horizontally disposed table, having a plurality of work holders thereon, means to rotate said table intermittently to carry said work holders into a plurality of stations including a pair of adjacent heating stations, a stationary support having a portion thereof extending over said heating stations, a first pair of tracks on said support above one heating station and extending in a direction substantially parallel to the movement of a work holder to and from said station, a second pair of tracks on said support above the other heating station and extending at an angle to said first pair of tracks and substantially parallel to the movement of a work holder to and from said other station, a heating device on each of said pairs of tracks with each heating device facing one heating station, means to connect said heating devices for movement together, and means to move said heating devices continuously back and forth along said tracks to heat work pieces carried by work holders in said stations.

11. In a brazing machine, a frame including an elevated structure having a track thereon, a heater, means to suspend said heater on said track for movement thereon, a vertically extending support on said frame, a horizontally extending dial mounted for rotation on said support, a plurality of work holders located at spaced points on said dial, said structure and support being so positioned on said frame that said work holders will be positioned under said heater at one point in the rotation of said dial, means to rotate said dial intermittently to position said work holders in sequence under said heater, and means to reciprocate said heater continuously on said track to move said heater back and forth above work on a work holder then positioned beneath said heater.

References Cited in the file of this patent

UNITED STATES PATENTS

| | | |
|---|---|---|
| 1,514,815 | Anderson | Nov. 11, 1924 |
| 1,841,194 | Lormor | Jan. 12, 1932 |
| 1,949,901 | Cosh | Mar. 6, 1934 |
| 2,267,296 | Bennewitz et al. | Dec. 23, 1941 |
| 2,435,638 | Shorter | Feb. 10, 1948 |
| 2,468,816 | Duce | May 3, 1949 |
| 2,483,934 | Richardson | Oct. 4, 1949 |
| 2,748,737 | Willard et al. | June 5, 1956 |
| 2,786,433 | Vieth | Mar. 26, 1957 |